(12) United States Patent
Shen et al.

(10) Patent No.: US 12,222,942 B2
(45) Date of Patent: Feb. 11, 2025

(54) REMOTE DATASOURCE-BASED OPTIMIZATION OF PROCEDURE-BASED MULTI-DATASOURCE QUERIES

(71) Applicant: International Business Machines Corporation, Armonk, NY (US)

(72) Inventors: Hai Jun Shen, Tianjin (CN); Chang Sheng Liu, Beijing (CN); Lei Cui, Beijing (CN); Ya Qiong Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 17/483,976

(22) Filed: Sep. 24, 2021

(65) Prior Publication Data

US 2023/0100587 A1   Mar. 30, 2023

(51) Int. Cl.
*G06F 16/2453* (2019.01)

(52) U.S. Cl.
CPC .. *G06F 16/24542* (2019.01); *G06F 16/24537* (2019.01)

(58) Field of Classification Search
None
See application file for complete search history.

(56) References Cited

U.S. PATENT DOCUMENTS

| 9,805,093 | B2 | 10/2017 | Teletia et al. |
| 2005/0283493 | A1 | 12/2005 | Iwata et al. |
| 2008/0016080 | A1* | 1/2008 | Korn .................. G06F 16/2443 |
| 2008/0320440 | A1* | 12/2008 | Meijer ..................... G06F 8/72 |
| | | | 717/108 |
| 2010/0049628 | A1* | 2/2010 | Mannava ........... G06Q 30/0601 |
| | | | 705/26.1 |
| 2012/0290647 | A1* | 11/2012 | Ellison ............... G06F 3/04847 |
| | | | 709/203 |

(Continued)

FOREIGN PATENT DOCUMENTS

CN   105915588 A   8/2016

OTHER PUBLICATIONS

Saunak Chandra, "Driving Hybrid Cloud Analytics with Amazon Redshift and Denodo Data Virtualization", Amazon Web Services, Nov. 18, 2019, 8 pages.

(Continued)

*Primary Examiner* — Christopher J Raab
(74) *Attorney, Agent, or Firm* — Andre Adkins

(57) ABSTRACT

An approach is provided for optimizing multi-datasource queries in a networked computing environment. A procedure that contains a set of queries designed to access a specific set of data from a plurality of datasources in a virtualized hybrid storage environment (e.g., a virtualized hybrid cloud) is obtained. A set of mapped store procedures is created for the set of datasources referenced in the procedure. Each mapped store procedure includes a subset of queries that are applicable to a corresponding datasource from the set of queries in the procedure. These mapped store procedures are forwarded to the corresponding datasource for storage on the corresponding datasource. In response to a running of the procedure, execution of the mapped store procedure is commenced on each of the corresponding datasources on which they are stored.

20 Claims, 10 Drawing Sheets

(56) References Cited

U.S. PATENT DOCUMENTS

| | | | |
|---|---|---|---|
| 2013/0080480 A1* | 3/2013 | Mao | H04L 67/10 |
| | | | 707/E17.044 |
| 2014/0006382 A1 | 1/2014 | Barber et al. | |
| 2014/0351287 A1* | 11/2014 | Wolf | G06F 16/245 |
| | | | 707/779 |
| 2015/0161373 A1* | 6/2015 | Ortiz-Munoz | H04L 63/10 |
| | | | 726/7 |
| 2016/0092546 A1 | 3/2016 | Shivarudraiah | |
| 2016/0217159 A1* | 7/2016 | Dahan | G06F 16/21 |
| 2016/0328432 A1* | 11/2016 | Raghunathan | G06F 16/2264 |
| 2017/0308602 A1* | 10/2017 | Raghunathan | G06F 16/273 |
| 2018/0084007 A1* | 3/2018 | Dinerstein | H04L 63/1466 |
| 2019/0197142 A1* | 6/2019 | Glaser | G06F 16/1805 |
| 2019/0384846 A1* | 12/2019 | Mathur | G06F 16/24524 |

OTHER PUBLICATIONS

Michelle Betbadal, "Db2 (On Premises and Cloud)", IBM Community, Jul. 14, 2020, 11 pages.

TIBCO, "TIBCO Data Virtualization", Published Date: NA, 15 pages.

Author: NA, "Pushdown computations in PolyBase", Microsoft.com, Apr. 19, 2021, 8 pages.

Paul White, "Grouped Aggregate Pushdown", SQL Performance, Apr. 23, 2019, 12 pages.

* cited by examiner

REMOTE DATASOURCE-BASED OPTIMIZATION OF PROCEDURE-BASED MULTI-DATASOURCE QUERIES

TECHNICAL FIELD

The present invention relates generally to data storage and retrieval. More specifically, aspects of the present invention provide solutions that optimize procedures used to perform queries of data stored in a plurality of heterogeneous datasources in a virtualized hybrid storage (e.g., a virtualized hybrid cloud) networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

The large scale of resources provided by the network computing environment allows large amounts of data from many different sources to be stored across a large number of physical locations. One way that this large-scale storage can be provided is by providing a virtualized hybrid storage (e.g., a virtualized hybrid cloud or multi-cloud) environment. This virtualized hybrid storage environment may have data centers with data clusters at different countries/regions. These data centers may include on-premises data centers owned by the enterprise, private clouds, hosted private clouds and multiple public clouds, which may have data centers at various locations spread around the world, among others. In addition, these data centers may include heterogeneous data centers that operate using a plurality of different platforms.

Managing data on such a large scale can introduce a number of challenges that require special tools for performing data management. Utilization of virtualized hybrid storage-based solutions can help to meet these challenges by providing the end user access to a number of different heterogeneous datasources, which may have different structures, naming conventions, query languages, and/or the like, without the user being required to understand and implement queries based on these differences.

One solution that can be used to access data in a virtualized hybrid storage environment is via the use of a procedure. A procedure can generally be understood as a program module that contains a number of queries used to access data from the datasources in the virtualized hybrid storage environment. This procedure is executed at a virtualization layer, which adapts each of the queries contained in the procedure to take account of the specific attributes of each corresponding datasource to which the query is directed and reports any results to the end user.

SUMMARY

In general, aspects of the present invention provide an approach for optimizing multi-datasource queries in a networked computing environment. A procedure that contains a set of queries designed to access a specific set of data from a plurality of datasources in a virtualized hybrid storage environment (e.g., a virtualized hybrid cloud) is obtained. A set of mapped store procedures is created for the set of datasources referenced in the procedure. Each mapped store procedure includes a subset of queries that are applicable to a corresponding datasource from the set of queries in the procedure. These mapped store procedures are forwarded to the corresponding datasource for storage on the corresponding datasource. In response to a running of the procedure, execution of the mapped store procedure is commenced on each of the corresponding datasources on which they are stored.

A first aspect of the invention provides a method for optimizing multi-datasource queries in a networked computing environment, comprising: obtaining a procedure that contains a set of queries designed to access a specific set of data from a plurality of datasources in a virtualized hybrid storage environment; creating a set of mapped store procedures for the set of datasources referenced in the procedure, each mapped store procedure including a subset of queries that are applicable to a corresponding datasource from the set of queries in the procedure; forwarding each mapped store procedure of the set of mapped store procedures to the corresponding datasource for storage on the corresponding datasource; and commencing, in response to a running of the procedure, an execution on each of the corresponding datasources of the mapped store procedure stored thereon.

A second aspect of the invention provides a system for optimizing multi-datasource queries in a networked computing environment, comprising: a memory medium comprising instructions; a bus coupled to the memory medium; and a processor coupled to the bus that when executing the instructions causes the system to perform a method, comprising: obtaining a procedure that contains a set of queries designed to access a specific set of data from a plurality of datasources in a virtualized hybrid storage environment; creating a set of mapped store procedures for the set of datasources referenced in the procedure, each mapped store procedure including a subset of queries that are applicable to a corresponding datasource from the set of queries in the procedure; forwarding each mapped store procedure of the set of mapped store procedures to the corresponding datasource for storage on the corresponding datasource; and commencing, in response to a running of the procedure, an execution on each of the corresponding datasources of the mapped store procedure stored thereon.

A third aspect of the invention provides a computer program product embodied in a computer readable storage medium that implements a method for optimizing multi-datasource queries in a networked computing environment, the method comprising: obtaining a procedure that contains a set of queries designed to access a specific set of data from a plurality of datasources in a virtualized hybrid storage environment; creating a set of mapped store procedures for the set of datasources referenced in the procedure, each mapped store procedure including a subset of queries that are applicable to a corresponding datasource from the set of queries in the procedure; forwarding each mapped store procedure of the set of mapped store procedures to the corresponding datasource for storage on the corresponding datasource; and commencing, in response to a running of the procedure, an execution on each of the corresponding datasources of the mapped store procedure stored thereon.

Still yet, any of the components of the present invention could be deployed, managed, serviced, etc., by a service provider who offers to store a dataset in a networked computing environment.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
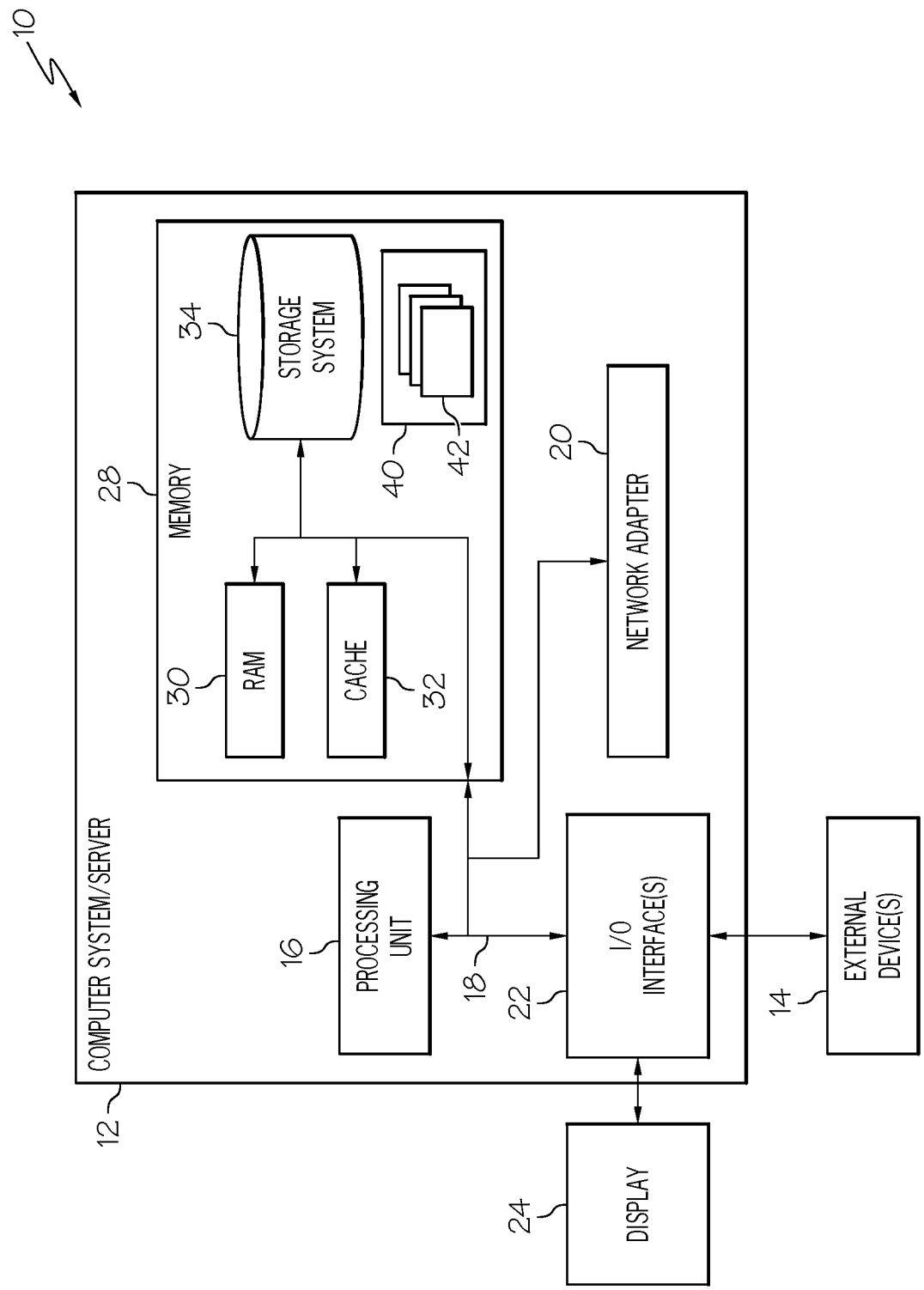
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for optimizing multi-datasource queries in a networked computing environment. A procedure that contains a set of queries designed to access a specific set of data from a plurality of datasources in a virtualized hybrid storage environment (e.g., a virtualized hybrid cloud) is obtained. A set of mapped store procedures is created for the set of datasources referenced in the procedure. Each mapped store procedure includes a subset of queries that are applicable to a corresponding datasource from the set of queries in the procedure. These mapped store procedures are forwarded to the corresponding datasource for storage on the corresponding datasource. In response to a running of the procedure, execution of the mapped store procedure is commenced on each of the corresponding datasources on which they are stored.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is illustrated. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radiofrequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
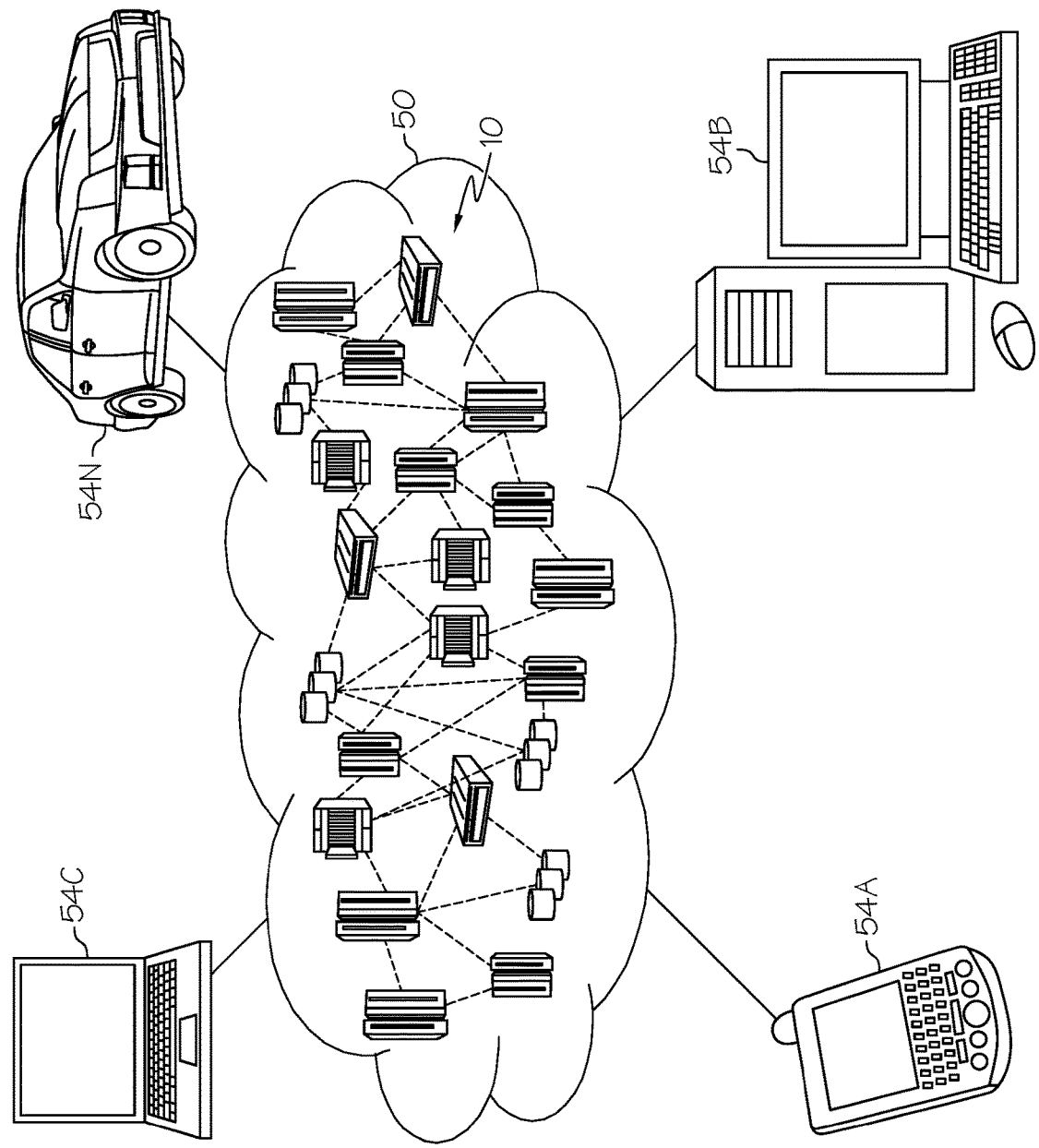
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
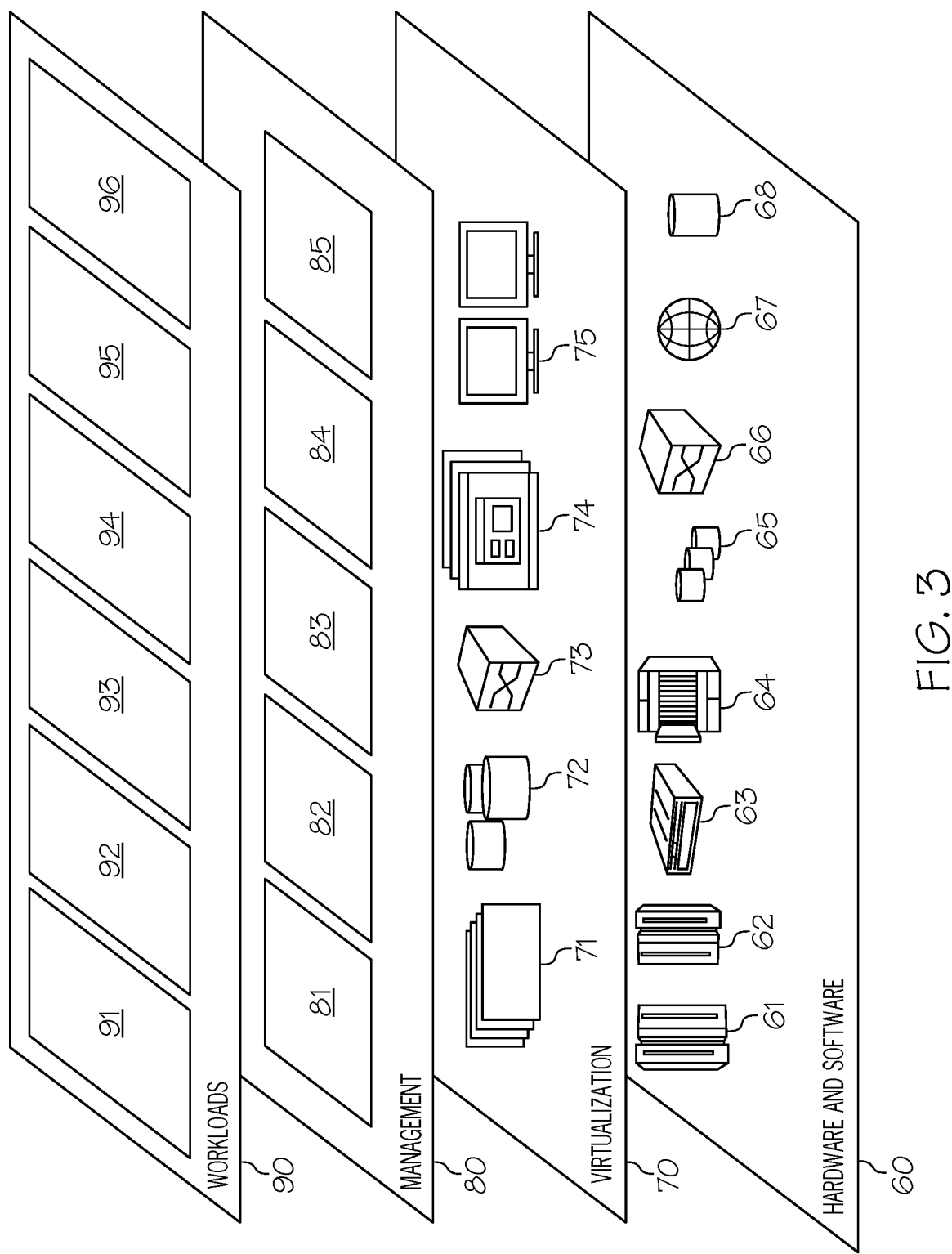
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and retrieval 96. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 80, which can be tangibly embodied as modules of program code 42 of program/utility 40 (FIG. 1). However, this need not be the case. Rather, the functionality recited herein could be carried out/implemented and/or enabled by any of the layers 60, 70, 80, and 90 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
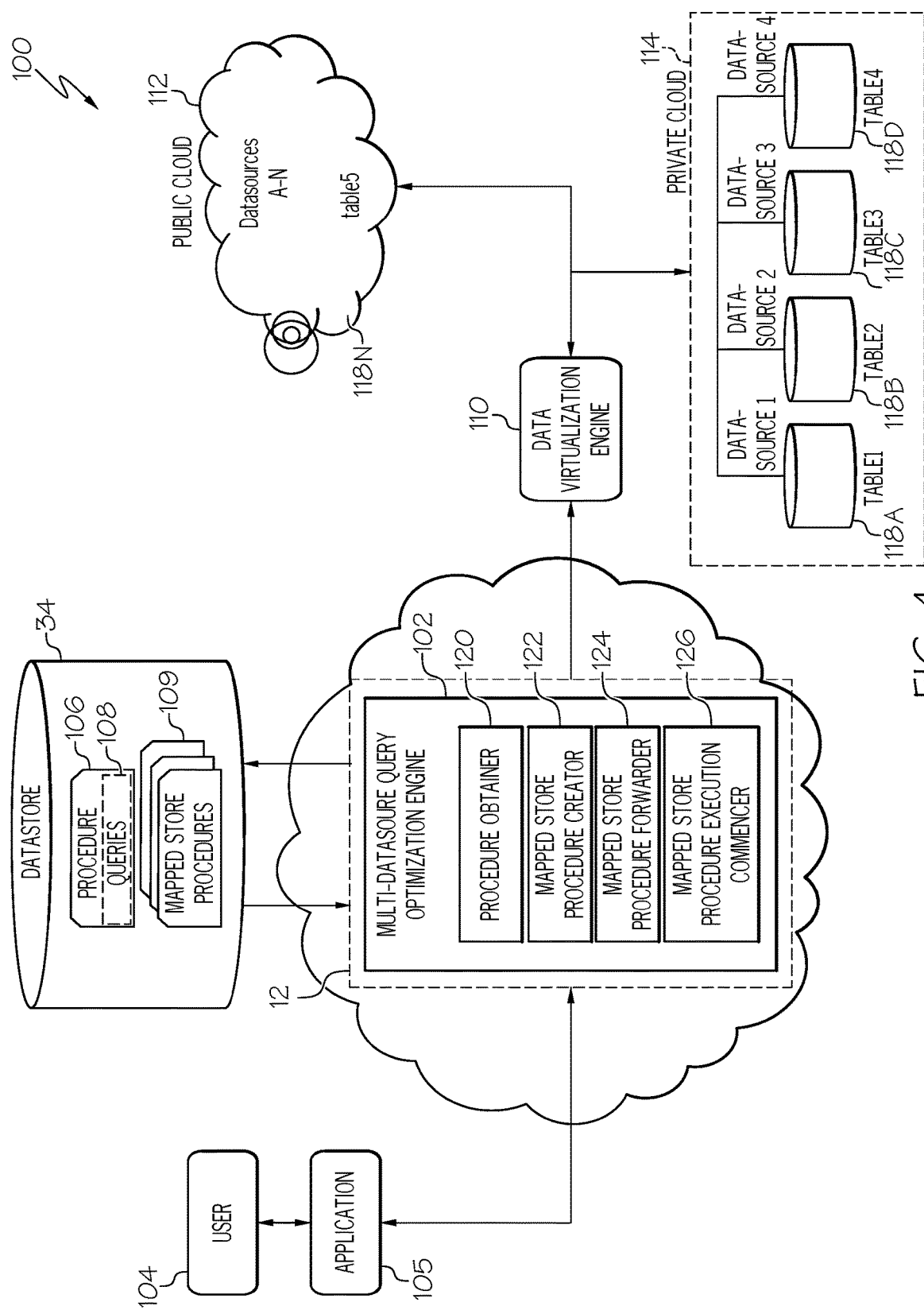
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 100 (e.g., a cloud computing environment). In an embodiment, networked computing environment 100 is a virtualized hybrid storage (e.g., virtualized hybrid cloud) environment. A stand-alone computer system/server 12 is shown in FIG. 4 for illustrative purposes only. In the event the teachings recited herein are practiced in a networked computing environment 100, the physical servers/datasources associated with each public cloud 112 and/or private cloud 114 tables 118A-N need not have a multi-datasource query optimization engine (hereinafter "system 102"). Rather, system 102 could be loaded on a server or server-capable device that communicates (e.g., wirelessly) with one or more physical servers associated with the datasources 118A-N to provide multi-datasource query optimization therefor. Regardless, as depicted, system 102 is shown within computer system/server 12. In general, system 102 can be implemented as program/utility 40 on computer system 12 of FIG. 1 and can enable the functions recited herein. It is further understood that system 102 may be incorporated within or work in conjunction with any type of system that receives, processes, and/or executes commands with respect to data storage and retrieval in a networked computing environment. Such other system(s) have not been shown in FIG. 4 for brevity purposes. In an embodiment, one or more of the functions these order system(s) and/or any other function of system 102 can be performed by a cognitive engine, such as IBM's Watson Search or Watson Explorer (IBM is a registered trademark and Watson is a trademark of International Business Machines Corporation).

System 102 may perform multiple functions. Specifically, among other functions, system 102 can optimize a set of queries 108 in a procedure 106 written by a user 104, such that later execution by user 104 (e.g., via an application 105) can be accomplished more efficiently. To accomplish this, system 102 can include: a procedure obtainer 120, a mapped store procedure creator 122, a mapped store procedure forwarder 124, and a mapped store procedure execution commencer 126.

As shown, tables 118A-N in public cloud 112 and private cloud 114 are all members of one or more of a plurality of datasources that provide data storage for a number of data records being stored by a number of different users 104. To this extent, each of the datasources can provide storage using one of a number of different storage solutions. As shown, table 1 118A is part of datasource 1, table 2 1186 is part of datasource 2, table 3 118C is part of datasource 3, table 4 118D is part of datasource 4, and table 5 118N is part of datasources A-N within public cloud 112. It should be understood that networked data centers of other types are envisioned as well, including, but not limited to, a hosted private cloud.

In any case, in a virtualized environment, such as a virtual hybrid cloud environment, a user 104 wishing to access data (e.g., via an application 105) will generally not do so directly, but rather, user's 104 request will be processed through a data virtualization engine 110. Data virtualization engine 110 provides an abstraction layer between tables 118A-N and user 104, allowing user 104 to access data which may be stored in heterogeneous datasources that utilize different storage schemes, structures, naming conventions, query languages, etc., without having to know and understand all of the details pertaining thereto.

Figure 5:
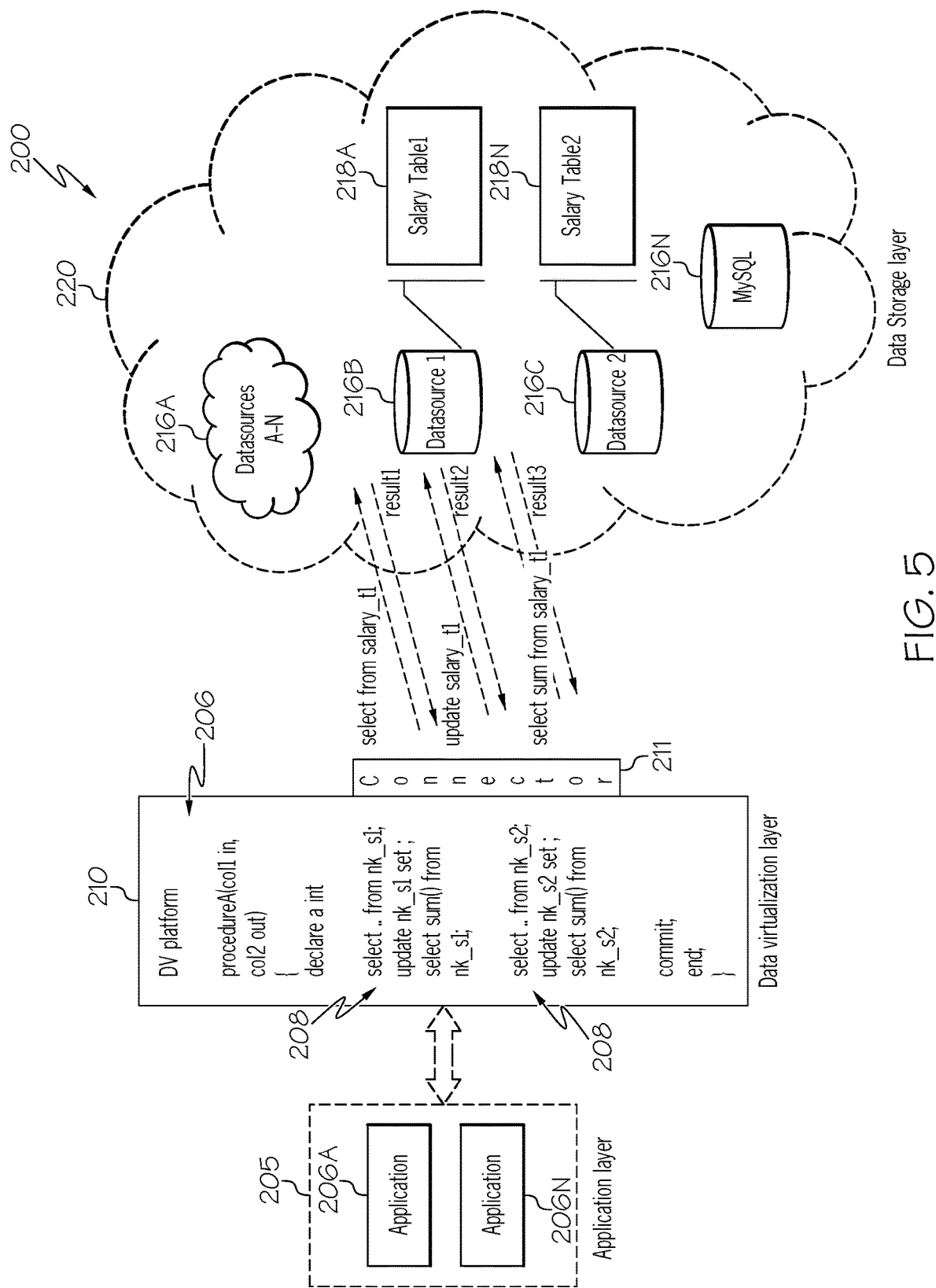
FIG. 5 depicts an example functional diagram of a call of a procedure according to an embodiment of the present invention.

Referring now to FIG. 5, a functional diagram 200 of a call of a procedure 206 is depicted according to an embodiment of the present invention. As illustrated, procedure 206 contains a set of queries 208 for selecting and updating certain employees' salaries within a plurality of different tables 218A-N. Procedure 206 has been called for execution (e.g., by one or more applications 206A-N in application layer 205) and execution of queries 208 contained within procedure 206 has been initiated within data virtualization layer 210. In response to procedure 206 being called, virtualization layer 210 issues a call to each of datasources 216A-N in data storage layer 220 that are referenced by queries 208 in procedure 206. Data virtualization layer 210 can access data storage layer 220 through a connector 211, which establishes a communications bridge between data virtualization layer 210 and 220 and can include Java Database Connectivity (JDBC), Open Database Connectivity (ODBC), and/or any other connectivity solutions now known or later developed. In any case, datasources 216A-N access the data in tables 218A-N in response to the calls, perform query 208 instructions and returns the results to data virtualization layer 210.

The inventors of the invention described herein have discovered certain deficiencies in the current solutions for implementing multi-datasource procedure-based queries. In such an implementation, procedure 206 may have a large number of queries 208 that are directed to a plurality of different datasources 216A-N. Moreover, as shown in FIG. 5, these queries 208 may require a plurality of different processes to performed on the data in a particular table 218A-N of a particular datasource 216A-N. In current solutions, all or substantially all of the query processing functions are performed at the data virtualization layer 210 (e.g., by data virtualization engine 110). As shown, this requires that the results of each part of queries 208 be returned from datasources 216A-N, processed at virtualization layer 210, and any changes sent back to the datasources. These repeated transfers of information between data virtualization layer 210 and datasources 216A-N consumes both time and resources and can, in some instances, overwhelm available bandwidth. In addition, queries 208 in a procedure are generally performed in serial mode, with processing for a subsequent query 208 being processed only after processing for the previous query or queries 208 have been completed.

Further, each time procedure 206 is called for execution, each of queries 208 may require translation in order to map specific values (e.g., table names, field names, and/or the like) from the placeholder values contained in procedure 206 to the actual values found in the corresponding datasources 216A-N. Still further, in cases, similar to those illustrated in FIG. 5, in which one or more datasources 216A-N use a different query language from the language user for queries 208 in procedure, this a further translation may be needed to transform the query 208 into the datasource 216A-N query language. For example, assume procedure 206 contains 200 structure query language (SQL) statements. At execution time, SQL translation would have to be performed 200 times, once for each statement. Additionally, a fetch operation would have to be done 200 times for each of the remote datasources 216A-N referenced and 200 sets of results would have to be transmitted between data virtualization layer 210 and remote datasources 216A-N. Moreover, all of the same mappings, translations, and back-and-forth transfers must be performed every time the procedure is executed.

Certain embodiments of the present invention may offer various technical computing advantages, including a more optimized solution for optimizing multi-datasource queries by pushing down execution of queries 208 contained in procedure 206 from data virtualization layer 210 to data storage layer 220. This pushdown allows all or the majority of processing of query 208 steps contained in procedure 206 to be performed remotely at the datasources 216A-N in rather data storage layer 210 than by data virtualization engine 110 (FIG. 4) in data virtualization layer 210, minimizing the transfer of information between data virtualization layer 210 and data storage layer 220. As a result, computational and networking function is improved by distributing the necessary processing and minimizing the amount of data that needs to be transferred across the network. Moreover, the processing of information in multiple locations allows for queries 108 to be processed in parallel, as opposed to the sequel processing that is performed at the data virtualization layer 210, saving time and resources.

Referring again to FIG. 4, procedure obtainer 120 of system 102, as performed by computer system/server 12, is configured to obtain procedure 106. Procedure 106 contains a set of queries 108 that are designed (e.g., by user 104) to access a specific set of data from a plurality of datasources in a virtualized hybrid storage environment. These queries 108 are encapsulated within procedure 106, which can be written in any language that is adapted to include database queries including, but not limited to, Java, C++, and/or the like. In any case, calling a completed (e.g., after procedure 106 has been compiled) procedure 106 (e.g., using application 105) causes the query 108 statements within to be executed with respect to whatever parameters have been provided to procedure and results will be returned. To this extent, procedure 106 allows a set of queries 108, which may be identical with the exception of certain parameter values, to be executed a number of times with a simple call to procedure 106, eliminating the need to rewrite the queries 108 each time.

In any case, procedure obtainer 120 can obtain procedure 106 from user 104, from application 105, from datastore 34, and/or from any other source now known or later developed. It should be understood that the obtaining of procedure 106, as described herein is performed, for the purposes described hereafter. To this extent procedure 106, can be obtained once it has been finalized but prior to execution. In an embodiment, procedure obtainer 120 can obtain procedure 106 in response to procedure 106 having been compiled, assembled, or otherwise transformed into an executable form. In an alternate embodiment, procedure obtainer 120 can obtain procedure 106 in response to procedure 106 having been cataloged or otherwise made available to user 104 and or application 105 to be called for execution. In yet another alternative embodiment, procedure obtainer 120 can obtain procedure 106 in response to a first time that procedure 106 is ever called for execution but prior to commencement of execution.

Figure 6:
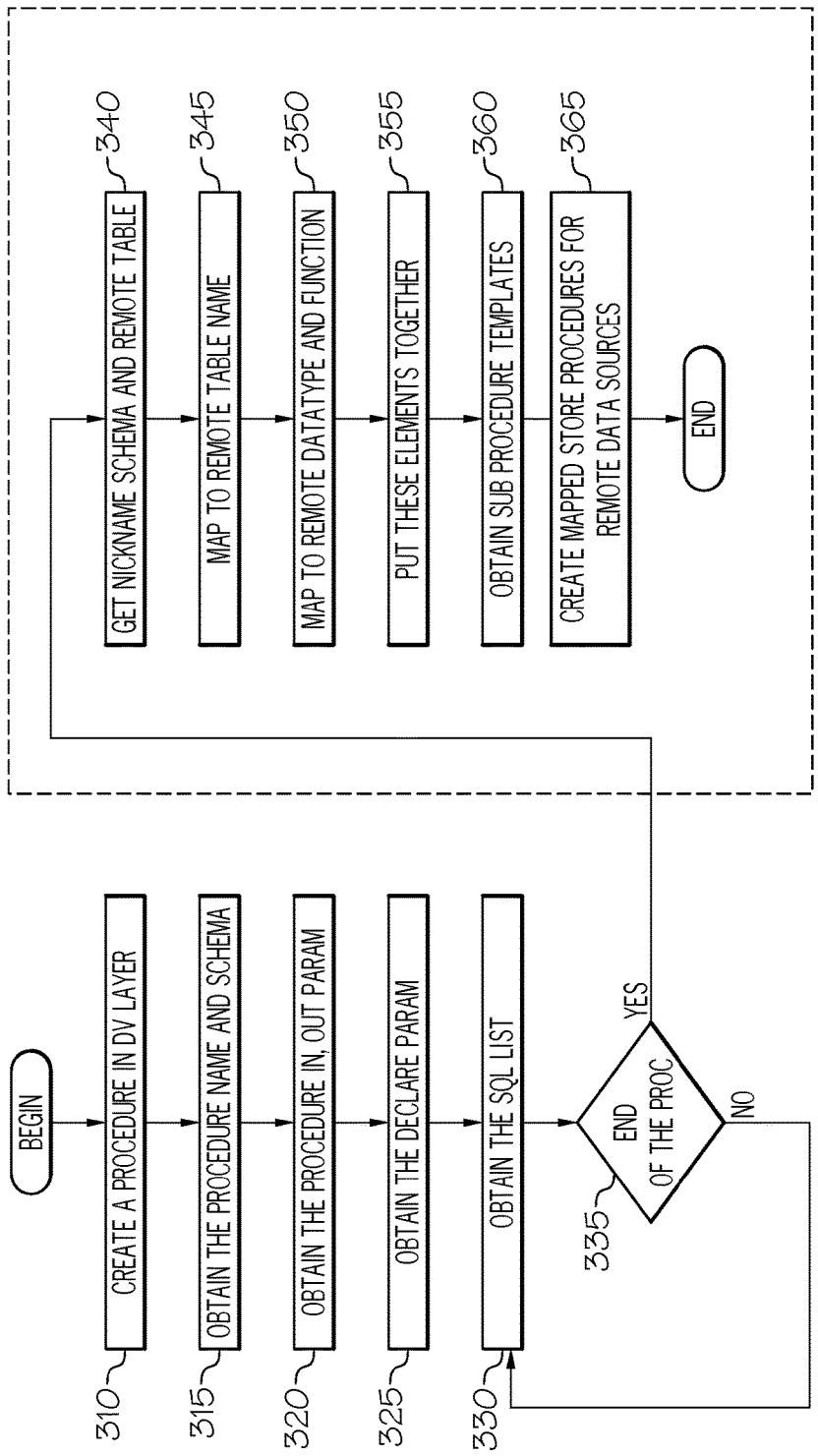
FIG. 6 depicts an example flow diagram according to an embodiment of the present invention.

Referring now to FIG. 6, an example flow diagram 300 according to an embodiment of the present invention is shown. Referring additionally to FIG. 4, at 310, procedure 106 is created in data virtualization engine (DV) 110. Procedure 106 can be developed by a developer user 104, formed by automatically merging already developed queries 108 into a procedure template, automatically generated by a query generator, and/or utilizing any other solution now known or later developed. Once procedure 106 has been created, at 315, the schema and name of procedure 106 are obtained. In addition, at 320, input and output parameters of procedure 106 are obtained. Moreover, at 325, the declare parameters of procedure 106 are obtained. Finally, at 330, the list of queries (e.g., SQL statements) in procedure 106 are obtained one by one. The retrieval of queries continues in 335 until the end of procedure 106 is reached.

Referring again to FIG. 4, mapped store procedure creator 122 of system 102, as performed by computer system/server 12, is configured to create a set of mapped store procedures 109 for the set of datasources referenced in the procedure. Each mapped store procedure 109 created by mapped store procedure creator 122 is created for a specific datasource and includes a subset of queries 108 from the set of queries 108 found in procedure 106 that are applicable to the corresponding datasource.

Referring again to FIG. 6 in conjunction with FIG. 4, to accomplish this, once a set of queries has been obtained at 330 and the end of procedure 106 has been reached at 335, the queries 108 can be grouped together with other queries 108 pertaining to the same datasource. At 340, nickname schema and remote table information that pertain to each query 108 in a group of queries 108 associated with a datasource can be retrieved from the remote table 118A-N. At 345, the nicknames values of the queries 108 in procedure 106 are mapped to names in the remote tables 118A-N. To this extent, the same nickname in procedure 106 that refers to similar data in two different tables 118A-N can be translated to a first local nickname in a first table 118B belonging to a first datasource and a different second local nickname in the second table 118N belonging to a second datasource.

Figure 7:
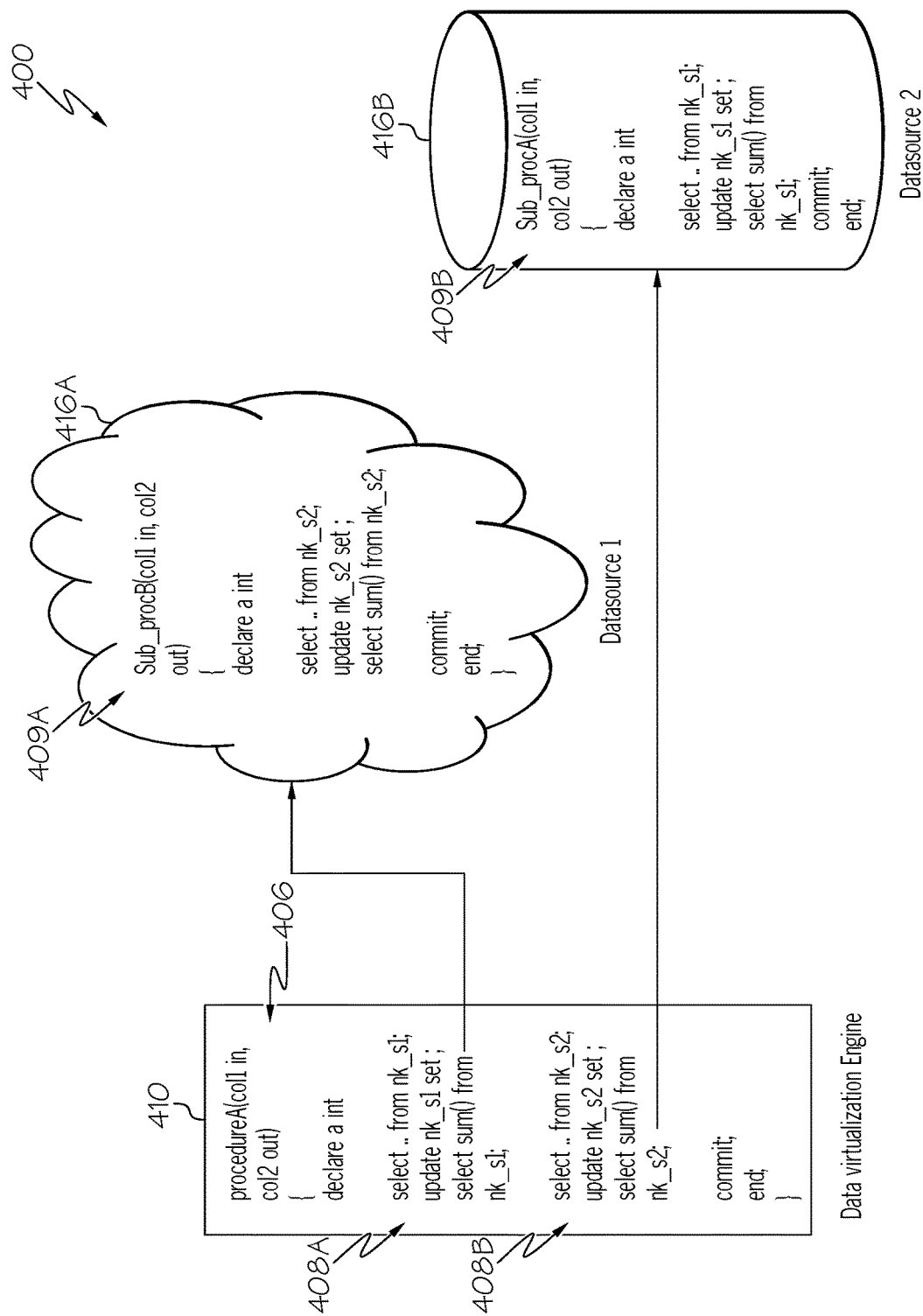
FIG. 7 depicts an example data diagram according to an embodiment of the present invention.

Referring now to FIG. 7, an example data diagram 400 illustrating the mapping in 345 (FIG. 6) is shown according to an embodiment. As illustrated, procedure 406 in data virtualization engine 410 contains two queries 408A-B, a first query 408A that corresponds to a first datasource 416A, which has first datasource type, and a second query 408B that corresponds to a second datasource 416B, which has a second datasource type. As shown, nickname nk_s1 in first query 408A corresponds to nickname nk_s2 in first datasource 416A. As such, the map store procedure 409A corresponding to first datasource 416A created by mapped store procedure creator 122 (FIG. 4) will have the local nickname value nk_s2 rather than the value in the original procedure 406. Similarly, whereas the nickname value in second query 408B is nk_s2, it has been changed to nk_s1 in map store procedure 409B to reflect the local nickname value fond in second datasource 416B.

Referring again to FIG. 6 in conjunction with FIG. 4, at 350, mapped store procedure creator 122 also maps elements of queries 108 in procedure 106 to datatypes and functions in the remote datasources. For example, an element of a query 108 in procedure 106 may have a first numerical datatype (e.g., integer) while the data in the corresponding datasource table 118A-N has a different numerical datatype (e.g., float). Mapped store procedure creator 122 would modify the original datatype in procedure 106 during the creation of mapped store procedure 109 to correspond to the datatype found in the corresponding datasource. Further, mapped store procedure creator 122 can modify the syntax of query statement to reflect the idiosyncrasies of the specific type of datasource. For example, if a first datasource uses SQL that has the same syntax as in procedure 106 would a second datasource used SQL that has a different syntax (or even a different query language altogether), the syntax of the SQL in the mapped store procedure 109 for the first datasource may remain relatively unchanged while the mapped store procedure 109 for the second datasource may be modified, potentially substantially. Similarly, if a first datasource has a default value for the maximum number of records that will be provided while a second datasource has no default value or a default value that is larger, mapped store procedure creator 122 can specify modified one or more values in the mapped store procedures for the two datasources that harmonize the two values and/or remove the maximum altogether. In any case the mapping functions accomplish this task automatically without the need for user intervention.

In 355, all of the mappings, naming conventions, and the like are assembled together for each group of datasource-corresponding queries 108, to form the subset of queries that will be included in each mapped store procedure 109. Then in 360 sub procedure templates are obtained. These sub procedures are themselves procedures that can be called from the original procedure 106, using the input and output parameters that are included in the original procedure 106 but are specific to the subset of queries that are to be performed on the datasource corresponding to the specific sub-procedure. In 365 the query 318 subsets are merged with the corresponding sub-procedures to form a plurality of mapped store procedures 109, which can include a distinct mapped store procedure 109 for each datasource which needs to be accessed to perform the actions of the original procedure 106.

Figure 8:
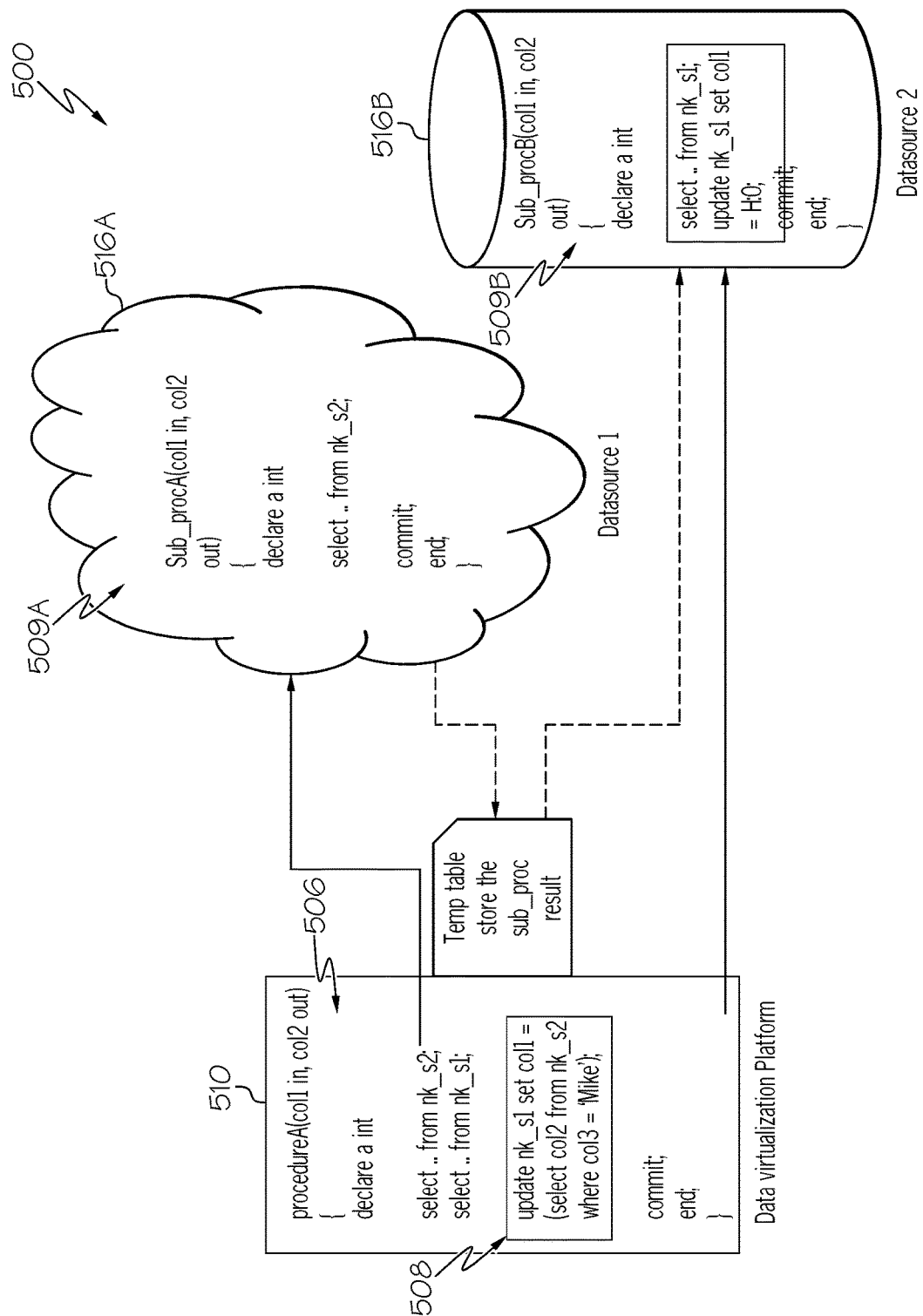
FIG. 8 depicts an example functional diagram according to an embodiment of the present invention.

Referring now to FIG. 8, an example functional diagram 500 is depicted according to an embodiment of the present invention. In an embodiment, mapped store procedure creator 122 can also create a temporary table 518T for facilitating combing and/or transferring data between datasources 516A-B, such as when query 508 contains a mixed SQL statement that references data from tables in different datasources 516A-B. For example, as shown in FIG. 8, procedure 506 contains a query that updates data in datasource 516B with data in datasource 516A. Mapped store procedure creator 122 can create a sub-procedure call in mapped store procedure 509A that corresponds to datasource 516A that forward query results to temporary table 518T and can create a sub-procedure call in mapped store procedure 509B that corresponds to datasource 516B that retrieves the data stored in temporary table 518T and updates its own records accordingly. Alternatively, in instances in which results from both datasources 516A-B are required for a particular function, temporary table 518T can be used to store the necessary records and the processing can be performed at data virtualization platform 510 before remaining processing, if any, is returned to mapped store procedures 509A-B at datasources 516A-B.

Referring again to FIG. 4, mapped store procedure forwarder 124 of system 102, as performed by computer system/server 12, is configured to forward each mapped store procedure 109 of the set of mapped store procedures 109 to the corresponding datasource. As a result, each mapped store procedure 109 is stored on the datasource that it references so that it can be called and executed locally on the remote datasource.

Figure 9:
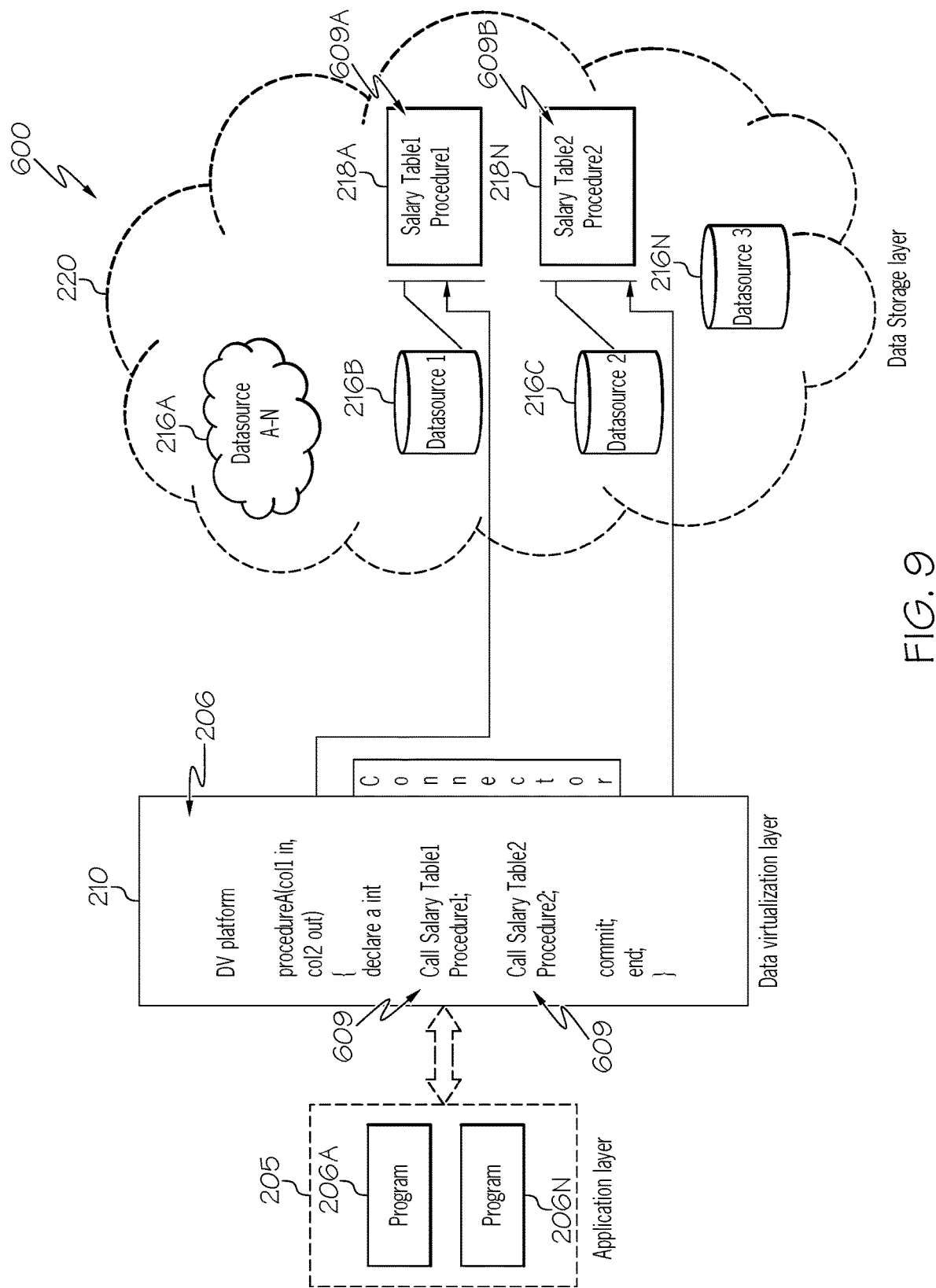
FIG. 9 depicts an example functional diagram of an optimized call of a procedure according to an embodiment of the present invention.

Referring now to FIG. 9, a functional diagram 600 of an optimized call of a procedure 206 is depicted according to an embodiment of the present invention. As illustrated, mapped store procedure 609A has been forwarded to datasource 218A and is stored therein. Similarly, mapped store procedure 609B has been forwarded to datasource 218A and is stored therein. Moreover, procedure 206 has been modified to contain a set of calls 609 to mapped store procedures 609A-B.

Referring again to FIG. 4 in conjunction with FIG. 9, mapped store procedure execution commencer 126 of system 102, as performed by computer system/server 12, is configured to commence execution of the each of the mapped store procedures on its corresponding database in response to the running of the application. As stated, procedure 206 now has a set of calls 609 to mapped store procedures 609A-B. When procedure 206 is executed, mapped store procedures 609A-B are called, causing a majority, if not all, of the processing to be performed at the data storage level 220. Only processing that requires intermediate results from multiple tables need be processed at data virtualization layer 210, where the set of results can be aggregated to obtain a final result set. These aggregating function results can, if there is further processing to be done, then be forwarded to each of the datasources and the execution of the mapped store procedure stored on each datasource can continue thereon based on the aggregating function results. Absent queries of this type, in many instances, only a final result need be forwarded from the datasources to data virtualization layer 210.

Figure 10:
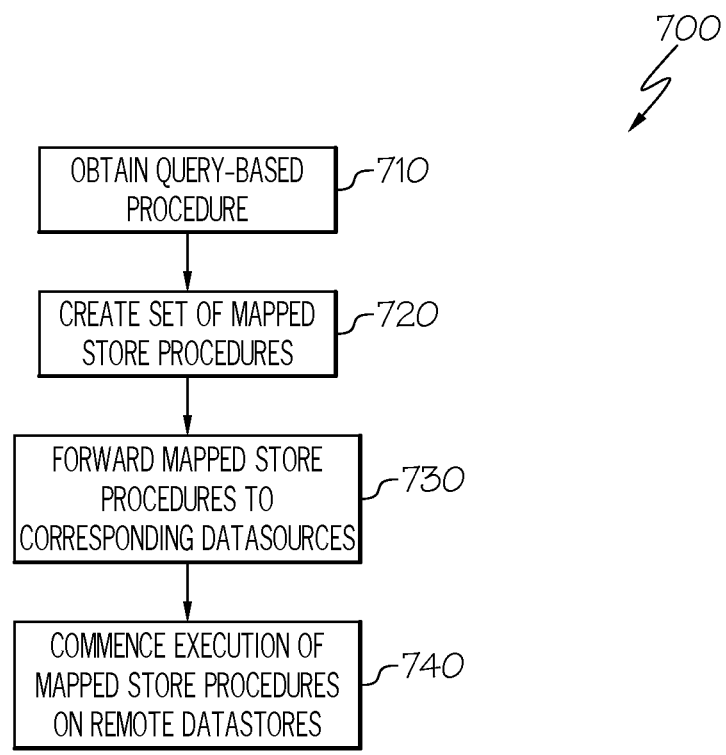
FIG. 10 depicts an example process flowchart according to an embodiment of the present invention.

Referring now to FIG. 10, in conjunction with FIG. 4, a process flowchart 700 according to an embodiment of the present invention is shown. At 710, procedure obtainer 120 of system 102, as performed by computer system/server 12, obtains a procedure 106 that contains a set of queries 108 designed to access a specific set of data from a plurality of datasources in a virtualized hybrid storage environment. At 720, mapped store procedure creator 122 of system 102, as performed by computer system/server 12, creates a set of mapped store procedures 109 for the set of datasources referenced in procedure 106. Each of these mapped store procedures 109 includes a subset of the queries 108 that are applicable to the corresponding datasource from the set of queries 108 in procedure 106. At 730, mapped store procedure forwarder 124 of system 102, as performed by computer system/server 12, forwards each mapped store procedure 109 of the set of mapped store procedures 109 to the corresponding datasource for storage on the corresponding datasource. At 740, mapped store procedure execution commencer 126 of system 102, as performed by computer system/server 12, commences, in response to the running of procedure 106, an execution on each of the corresponding datasources of the mapped store procedure 109 stored thereon.

The process flowchart of FIG. 10 and block diagrams of the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While shown and described herein as an approach for optimizing multi-datasource queries in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for optimizing multi-datasource queries in a networked computing environment. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for optimizing multi-datasource queries in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single dataset, or may be distributed over different locations including over different storage devices and disparate memory devices.

Furthermore, systems/units may also be implemented as a combination of software and one or more hardware devices. For instance, system 102 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed by the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for optimizing multi-datasource queries in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing multi-datasource queries in a networked computing environment, comprising:
    obtaining a procedure comprising a plurality of placeholder values, that contains a set of queries designed to access a specific set of data from a plurality of datasources in a virtualized hybrid storage environment;
    creating, at a data virtualization layer, a set of mapped store procedures for the set of datasources referenced in the procedure for mapping from the plurality of placeholder values based on translation of each query of the set of queries to the specific set of data, each mapped store procedure comprising a subset of queries that are applicable to a corresponding datasource from the set of queries in the procedure;
    forwarding, from the data virtualization layer, each mapped store procedure of the set of mapped store procedures to the corresponding datasource for storage on the corresponding datasource; and
    commencing, in response to a running of the procedure, an execution on each of the corresponding datasources of the mapped store procedure stored thereon.

2. The method of claim 1, wherein the set of queries access data in a first datasource and a second datasource in the virtualized hybrid storage environment, and
    wherein the creating of the set of mapped store procedures creates a first mapped store procedure that includes a first subset of queries that are applicable
    to the first datasource and a second mapped store procedure that includes a second subset of queries that are applicable to the second datasource.

3. The method of claim 1, further comprising:
    retrieving a set of results from the execution of the corresponding mapped store procedure on of the corresponding datasources; and
    aggregating the set of results to obtain a final result set.

4. The method of claim 3, further comprising:
    retrieving, in response to a presence of an intermediate aggregating function, in the set of queries, an intermediate of results from the execution of the corresponding mapped store procedure on of the corresponding datasources;
    performing the aggregating function at the data virtualization layer;
    forwarding aggregating function results to each of the datasources; and continuing the execution on each of the corresponding datasources of the mapped store procedure stored thereon based on the aggregating function results.

5. The method of claim 1, the creating further comprising: substituting a set of naming attribute in the subset of queries from nicknames found in the procedure to local naming attributes specific to a corresponding datasource;
    transforming the subset of queries that are applicable to the corresponding datasource from a query language contained in the procedure to a second query language that corresponds to the corresponding datasource to get a set of transformed queries; and
    saving the set of transformed queries with the local naming attributes as the remaining elements as the mapped store procedure.

6. The method of claim 1, further comprising replacing a set of queries in the procedure with a set of calls to the set of mapped store procedures.

7. The method of claim 1, wherein the networked computing environment is a cloud computing environment, and wherein the virtualized hybrid storage environment is a virtualized hybrid cloud.

8. A system for optimizing multi-datasource queries in a networked computing environment, comprising:
a memory medium comprising instructions; a
bus coupled to the memory medium; and
a processor coupled to the bus that when executing the instructions causes the system to perform a method, comprising:
obtaining a procedure comprising a plurality of placeholder values, that contains a set of queries designed to access a specific set of data from a plurality of datasources in a virtualized hybrid storage environment;
creating, at a data virtualization layer, a set of mapped store procedures for the set of datasources referenced in the procedure for mapping from the plurality of placeholder values based on translation of each query of the set of queries to the specific set of data, each mapped store procedure comprising a subset of queries that are applicable to a corresponding datasource from the set of queries in the procedure;
forwarding, from the data virtualization layer, each mapped store procedure of the set of mapped store procedures to the corresponding datasource for storage on the corresponding datasource; and
commencing, in response to a running of the procedure, an execution on each of the corresponding datasources of the mapped store procedure stored thereon.

9. The system of claim 8, wherein the set of queries access data in a first datasource and a second datasource in the virtualized hybrid storage environment, and
wherein the creating of the set of mapped store procedures creates a first mapped store procedure that includes a first subset of queries that are applicable to the first datasource and a second mapped store procedure that includes a second subset of queries that are applicable to the second datasource.

10. The system of claim 8, the method further comprising:
retrieving a set of results from the execution of the corresponding mapped store procedure on of the corresponding datasources; and
aggregating the set of results to obtain a final result set.

11. The system of claim 10, the method further comprising:
retrieving, in response to a presence of an intermediate aggregating function, in the set of queries, an intermediate of results from the execution of the corresponding mapped store procedure on of the corresponding datasources;
performing the aggregating function at the data virtualization layer; forwarding aggregating function results to each of the datasources; and
continuing the execution on each of the corresponding datasources of the mapped store procedure stored thereon based on the aggregating function results.

12. The system of claim 8, the creating further comprising:
substituting a set of naming attribute in the subset of queries from nicknames found in the procedure to local naming attributes specific to a corresponding datasource;
transforming the subset of queries that are applicable to the corresponding datasource from a query language contained in the procedure to a second query language that corresponds to the corresponding datasource to get a set of transformed queries; and
saving the set of transformed queries with the local naming attributes as the remaining elements as the mapped store procedure.

13. The system of claim 8, further comprising replacing a set of queries in the procedure with a set of calls to the set of mapped store procedures.

14. The system of claim 8, wherein the networked computing environment is a cloud computing environment, and wherein the virtualized hybrid storage environment is a virtualized hybrid cloud.

15. A computer program product embodied in a computer readable storage medium that implements a method for optimizing multi-datasource queries in a networked computing environment, the method comprising:
obtaining a procedure comprising a plurality of placeholder values, that contains a set of queries designed to access a specific set of data from a plurality of datasources in a virtualized hybrid storage environment;
creating, at a data virtualization layer, a set of mapped store procedures for the set of datasources referenced in the procedure for mapping from the plurality of placeholder values based on translation of each query of the set of queries to the specific set of data, each mapped store procedure comprising a subset of queries that are applicable to a corresponding datasource from the set of queries in the procedure;
forwarding, from the data virtualization layer, each mapped store procedure of the set of mapped store procedures to the corresponding datasource for storage on the corresponding datasource; and
commencing, in response to a running of the procedure, an execution on each of the corresponding datasources of the mapped store procedure stored thereon.

16. The computer program product of claim 15, wherein the set of queries access data in a first datasource and a second datasource in the virtualized hybrid storage environment, and
wherein the creating of the set of mapped store procedures creates a first mapped store procedure that includes a first subset of queries that are applicable to the first datasource and a second mapped store procedure that includes a second subset of queries that are applicable to the second datasource.

17. The computer program product of claim 15, the method further comprising:
retrieving a set of results from the execution of the corresponding mapped store procedure on of the corresponding datasources; and
aggregating the set of results to obtain a final result set.

18. The computer program product of claim 17, the method further comprising:
retrieving, in response to a presence of an intermediate aggregating function, in the set of queries, an intermediate of results from the execution of the corresponding mapped store procedure on of the corresponding datasources;
performing the aggregating function at the data virtualization layer; forwarding aggregating function results to each of the datasources; and continuing the
execution on each of the corresponding datasources of the mapped store procedure stored thereon based on the aggregating function results.

19. The computer program product of claim 15, the creating further comprising:

substituting a set of naming attribute in the subset of queries from nicknames found in the procedure to local naming attributes specific to a corresponding datasource; and transforming the subset of queries that are applicable to the corresponding datasource from a query language contained in the procedure to a second query language that corresponds to the corresponding datasource to get a set of transformed queries;

saving the set of transformed queries with the local naming attributes as the remaining elements as the mapped store procedure.

20. The computer program product of claim 15, further comprising replacing a set of queries in the procedure with a set of calls to the set of mapped store procedures.

* * * * *